Patented Oct. 17, 1950

2,526,109

UNITED STATES PATENT OFFICE 2,526,109

PROCESS OF PREPARING ALLYLIC SUBSTITUTED 9-FLUORENECARBOXYLIC ACIDS

Richard T. Arnold, St. Paul, Minn.

No Drawing. Application April 11, 1949,
Serial No. 86,861

6 Claims. (Cl. 260—515)

The present invention relates to the introduction of allylic groups into the 9-position of 9-fluorenecarboxylic acid. These compounds are useful in various organic syntheses, and particularly in the production of pharmaceutical compounds having activity as analgesics, antispasmodics, anesthetics, etc.

Broadly, the invention involves the rearrangement of an allylic ester of 9-fluorenecarboxylic acid such that the allyl group is introduced into the 9-position. This reaction is found to occur in the presence of basic reagents.

It is therefore an object of the present invention to provide a process for the introduction of allylic groups into the 9-position of 9-fluorenecarboxylic acid.

The invention involves the conversion of esters of the following type

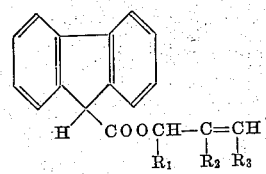

into allylic substituted 9-fluorenecarboxylic acids having the following formula

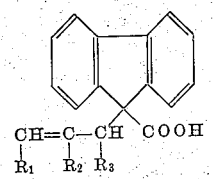

in which $R_1$, $R_2$, and $R_3$ may be alike or different, and may be hydrogen or aliphatic hydrocarbon radicals such as methyl, ethyl, propyl, and the like.

The present invention may be carried out on any of the starting materials contemplated herein by means of a basic reagent which is capable of bringing about the ionization of the original ester to form an anion, which then undergoes spontaneous internal rearrangement to form the anion of the desired acid. This is shown by the following reactions:

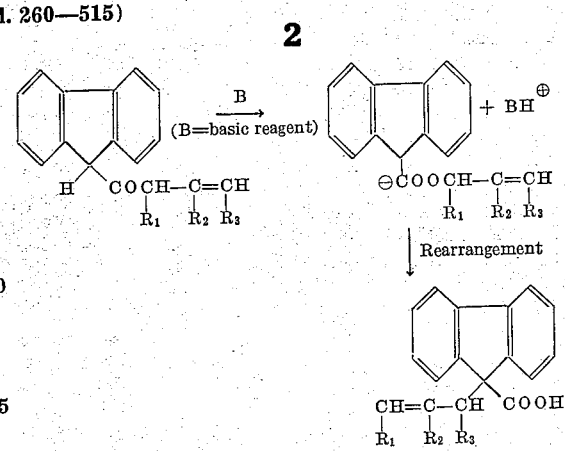

There is a wide variety of basic reagents which are capable of effecting the desired ionization of the original ester. In general, hydrides, amides, substituted amides, and alkoxides of active metals such as sodium, potassium, lithium, and the like, and also Grignard reagents, will bring about this rearrangement of allylic esters. Suitable basic reagents include the following: NaH, KH, NaNH$_2$, KNH$_2$, LiNH$_2$, NaN(C$_2$H$_5$)$_2$, NaOCH$_3$, NaOC$_2$H$_5$, KOC(CH$_3$)$_3$, and RMgX, where R is alkyl or aryl and X is Cl, Br, or I.

As will be seen from the reaction given above, the allylic group undergoes an inversion in the course of the rearrangement. This is of no importance in the preparation of simple allyl compounds. It is of importance, however, in the preparation of substituted allyl compounds in which, for example, N-crotyl and iso-crotyl, 9-fluorenecarboxylates are employed. Thus the present invention makes possible the preparation of compounds in substantially pure form which are difficult, if not impossible, to prepare in any other manner.

The reaction may be carried out preferably under anhydrous conditions by simply mixing the allyl ester with the basic reagent in a suitable inert solvent, which includes ethers such as diethyl ether, dioxane; a wide variety of hydrocarbons such as benzene, toluene, petroleum ether and the like; and alcohols when their alkoxides are employed as the basic reagent. In some instances, the reaction is exothermic and proceeds without the application of heat. In other instances it may be desirable to warm the reaction mixture under reflux for a short period of time, and then allow an extended period of time for the reaction to be carried out. Considerable variation is therefore possible in the specific reaction conditions which may be employed, depending upon the particular ester, the basic reagent, the solvent, and the like.

The following example will serve to illustrate the invention:

EXAMPLE

Preparation of 9-fluorenecarboxylic acid

A solution of 22.8 g. (0.10 mole) of benzilic acid in 350 ml. of dry, thiophene-free benzene was cooled in ice and the crystalline mass which resulted was treated with 40.0 g. (0.30 mole) of anhydrous aluminum chloride. The mixture was thoroughly shaken, then heated under reflux for three hours. Large quantities of hydrogen chloride were evolved. The resulting dark red solution was cooled and was cautiously decomposed by the addition of small pieces of ice. The mixture was diluted with 200 ml. of water and 100 ml. of concentrated hydrochloric acid and the benzene was distilled from the mixture. The product was separated by filtration; all the lumps were crushed; then the product was extracted by boiling with 200 ml. of 10% sodium carbonate solution. This extraction was repeated on the undissolved residue with 100 ml. of 10% sodium carbonate solution. The basic filtrates were strongly acidified with concentrated hydrochloric acid, and the resulting suspension was digested on the steam bath for one-half hour. By filtration 21.0 g. (quantitative yield) of 9-fluorene carboxylic acid, M. P. 200–225° C., was obtained. To purify the product, the dry acid was suspended in 100 ml. of benzene; the mixture was warmed on the steam bath; the product was recovered by filtration and washed on the filter with 25 ml. of benzene and finally with petroleum ether (B. P. 28–38° C.). In this way 17.3 g. (82.5%) of 9-fluorenecarboxylic acid, M. P. 226–229° C., was obtained. The melting points reported for this compound range from 220° to 232° C.

Preparation of allyl 9-fluorenecarboxylate

A mixture of 17.3 g. of 9-fluorenecarboxylic acid and 50 g. of purified thionyl chloride was heated under reflux for 45 minutes. The excess thionyl chloride was removed in vacuo. The residue was dissolved in 75 ml. of dry carbon tetrachloride. The solution was cooled in an ice bath, treated with a mixture of 20 ml. of pyridine and 25 g. of allyl alcohol, and allowed to stand overnight. The resulting solution was washed with 500 ml. of water, 100 ml. of dilute (7:100) hydrochloric acid, 10 ml. of 10% sodium bicarbonate solution, and finally with 200 ml. of water. The organic layer was dried over magnesium sulfate; the solvents were removed; and the residue was distilled at 3 mm. The fractions distilling between 170° and 180° C. at 3 mm. weighed 10.5 g. (50.7%), $n_D^{30}=1.6000$ to 1.6022. A center fraction was redistilled for analysis, B. P. 174° C. at 2 mm., $n_D^{30}=1.6012$.

Anal.—Calcd. for $C_{17}H_{14}O_2$: C, 81.58; H, 5.64. Found: C, 81.84; H, 5.92.

A direct esterification of 20.0 g. of 9-fluorenecarboxylic acid by heating it under reflux overnight with 200 ml. of allyl alcohol and 1.0 g. of p-toluenesulfonic acid produced 12.2 g. (51.2%) of allyl 9-fluorenecarboxylate.

Preparation of 9-allyl-9-fluorenecarboxylic acid

A mixture containing 2.24 g. (0.009 mole) of allyl 9-fluorenecarboxylate, 25 ml. of anhydrous toluene, and 0.92 g. (0.04 mole) of lithium amide was heated under reflux for three hours. The mixture was cooled, and 5 ml. of ethanol was added to destroy the excess lithium amide. The resulting solution was washed into a separatory funnel with alternate portions of water and ether. The organic layer was extracted with three 10 ml. portions of 10% sodium hydroxide. The combined aqueous solutions were extracted with ether. Acidification of the alkaline solution with concentrated hydrochloric acid precipitated 2.18 g. (97.5%) of 9-allyl-9-fluorenecarboxylic acid, M. P. 129.5–131° C. The acid, after crystallization from petroleum ether (B. P. 60–70° C.), melted at 131.5–132.5° C. A mixture with an authentic sample of 9-allyl-9-fluorenecarboxylic acid prepared according to the method of Wislicenus and Mocker (Ber., 46, 2772 (1913)), showed no depression of melting point.

Anal.—Calcd. for $C_{17}H_{14}O_2$: C, 81.58; H, 5.64. Found: C, 81.85; H, 5.62.

I claim as my invention:

1. Process of preparing allylic substituted 9-fluorenecarboxylic acid having the following formula

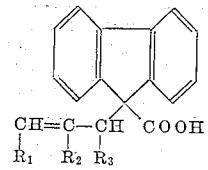

in which $R_1$, $R_2$, and $R_3$ are selected from the group consisting of hydrogen and aliphatic hydrocarbon radicals, which comprises reacting an ester having the following formula

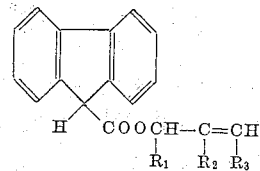

with an active metal hydride capable of converting said ester to an anion, and rearranging said anion to introduce the allyl group into the 9-position.

2. Process of preparing allylic substituted 9-fluorenecarboxylic acid having the following formula

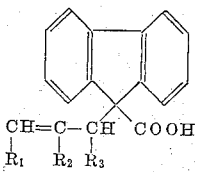

in which $R_1$, $R_2$, and $R_3$ are selected from the group consisting of hydrogen and aliphatic hydrocarbon radicals, which comprises reacting an ester having the following formula

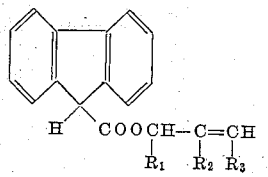

with an active metal alkoxide capable of converting said ester to an anion, and rearranging said anion to introduce the allyl group into the 9-position.

3. Process of preparing allylic substituted 9-fluorenecarboxylic acid having the following formula

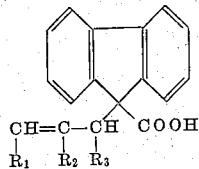

in which $R_1$, $R_2$, and $R_3$ are selected from the group consisting of hydrogen and aliphatic hydrocarbon radicals, which comprises reacting an ester having the following formula

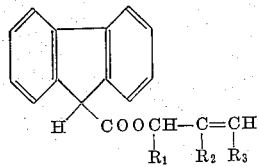

with an active metal amide capable of converting said ester to an anion, and rearranging said anion to introduce the allyl group into the 9-position.

4. Process according to claim 3 in which the active metal amide is lithium amide.

5. Process of preparing 9-allyl-9-fluorenecarboxylic acid which comprises reacting allyl 9-fluorenecarboxylate with lithium amide to convert said ester to an anion, and rearranging said anion to produce 9-allyl-9-fluorenecarboxylic acid.

6. Process of preparing allylic substituted 9-fluorenecarboxylic acids having the following formula

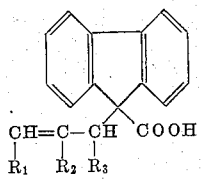

in which $R_1$, $R_2$, and $R_3$ are selected from the group consisting of hydrogen and aliphatic hydrocarbon radicals, which comprises reacting an ester having the following formula

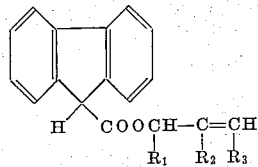

with a basic reagent capable of converting said ester to an anion, said basic reagent being selected from the group consisting of active metal hydrides, active metal alkoxides, active metal amides, and Grignard reagents, and rearranging said anion to introduce the allyl group into the 9-position.

RICHARD T. ARNOLD.

REFERENCES CITED

The following references are of record in the file of this patent:

UNITED STATES PATENTS

| Number | Name | Date |
| --- | --- | --- |
| 2,164,188 | Groll et al. | June 27, 1939 |

OTHER REFERENCES

Kimel et al.: Chem. Abstracts, vol. 38, col. 66 (1944).

Adams et al.: "Organic Reactions" (Wiley), vol. 2, pages 2–6 (1944).